United States Patent [19]

Merkert

[11] 4,040,814
[45] Aug. 9, 1977

[54] METHOD OF PRODUCING A COMPOSITION CONTAINING A LARGE AMOUNT OF VANADIUM AND NITROGEN

[75] Inventor: Rodney Francis Merkert, Buffalo, N.Y.

[73] Assignee: Union Carbide Corporation, New York, N.Y.

[21] Appl. No.: 643,682

[22] Filed: Dec. 23, 1975

[51] Int. Cl.² ........................ C22B 34/22; C22C 38/12
[52] U.S. Cl. ...................................... 75/.5 BC; 75/84; 75/129

[58] Field of Search ................. 75/130, .5 AC, .5 BC, 75/84, 129

[56] References Cited

U.S. PATENT DOCUMENTS

| | | | |
|---|---|---|---|
| 3,334,992 | 8/1967 | Downing | 75/129 |
| 3,383,196 | 5/1968 | Carpenter | 75/.5 BC |

*Primary Examiner*—Peter D. Rosenberg
*Attorney, Agent, or Firm*—Frederick J. McCarthy, Jr.

[57] ABSTRACT

Method for producing a material containing vanadium and nitrogen and less than 2% carbon and oxygen by vacuum furnacing.

2 Claims, No Drawings

METHOD OF PRODUCING A COMPOSITION CONTAINING A LARGE AMOUNT OF VANADIUM AND NITROGEN

The present invention is directed to a method for producing a material containing vanadium and nitrogen in proportions of about $V_2N$ and containing less than about two (2) per cent by weight in the aggregate of carbon and oxygen.

Vanadium is an important addition to steels and has been used as an addition to molten steel in the form of combined vanadium and carbon, and also nitrogen, as described in U.S. Pat. No. 3,334,992.

At times it is desirable to add substantial amounts of nitrogen to molten steel, in addition to vanadium.

It is therefore an object of the present invention to provide a method for making a material containing large amounts of vanadium and nitrogen for use as an addition to steels.

Other objects will be apparent from the following description and claims.

A method in accordance with the present invention comprises i. providing a mixture of $V_2O_3$ and carbon in substantially stoichiometric proportions in accordance with the following formula:

$$V_2O_3 + 3C \rightarrow 2V + 3 CO$$

ii. subjecting the mixture in a furnace to a temperature in the range of from about 1100° C to 1500° C under a reduced pressure in the range of from about 5 mm to 100 microns to cause reaction between mixture constituents and the evolution of CO and maintaining the temperature and pressure in said ranges until CO is essentially no longer evolved from the mixture iii. maintaining the temperature in the furnace in the range of about 1100° C to 1500° C and introducing nitrogen gas into the furnace to provide a nitrogen atmosphere in the furnace iv. thereafter repeating, in sequence, step (ii), step (iii) and step (ii) until the nitrogen content of the mixture is in the range of about 10 to 12% by weight.

The mixture is then cooled, e.g. to below about 200° C, in a non-oxidizing and non-nitriding atmosphere, e.g. inert gas, a vacuum, to prevent re-oxidation.

In the practice of the present invention $V_2O_3$ and carbon are blended in proportion in accordance with the following:

$$V_2O_3 + 3 C \rightarrow 2V + 3CO$$

The weight ratio of $V_2O_3$ to carbon is accordingly about 4.2. The blended mixture is then suitably briquetted or otherwise shaped using water and a conventional binder and dried. The dried mixture is charged to the hearth of a conventional vacuum furnace and heated to a temperature in the range of about 1100° C to 1500° C while applying a vacuum to the furnace to establish a reduced pressure in the range of 5 mm to 100 microns in the furnace. The mixture constituents will partially react to evolve CO which tends to increase the pressure in the furnace and is withdrawn from the furnace, but the reaction $V_2O_3 + 3 C \rightarrow 2 V + CO$ will not proceed to completion under the above noted temperature and pressure conditions. When the evolution of CO essentially ceases as can be detected by stabilization of the pressure in the furnance in the range of 100 to 300 microns; or alternatively by analysis of the exhaust gas from the furnance, nitrogen is introduced into the furnace, while maintaining the temperature in the furnace in the range of 1100° C to 1500° C, to provide a nitrogen environment in the furnace, preferably at about atmospheric pressure (i.e. $+760 \pm 50$ mm Hg) and the nitrogen reacts with the vandium constituent in the partially reacted mixture to provide from about 5 to 8% by weight nitrogen in the mixture. Nitrogen pressure of at least 0.25 atmosphere are suitable. The furnace, at a temperature of 1100° C to 1500° C, is again evacuated to provide a pressure of from about 5 mm to 100 microns and additional CO, and some nitrogen, is evolved and when the CO evolution essentially ceases, nitrogen is again introduced into the furnace to provide a nitrogen atmosphere as before, and nitrogen further reacts with the vanadium constituent in the mixture to provide a further increase of from about 1 by 3% by weight of nitrogen. By sequentially repeating the vacuum, nitriding, and vacuum steps, the nitrogen content in the mixture will eventually increase to about 10 to 12% by weight and the resulting material will be substantially combined vanadium and nitrogen, $V_2N$, and upon cooling in a non-oxidizing environment will contain less than about 2% by weight in the aggregate of carbon and oxygen. Such material is readily soluble in molten steel to provide vanadium and nitrogen additions to the steel. The number of times that the vacuum-nitrogen-vacuum treatment is required to be repeated will vary depending on the temperatures and pressures used and to some extent upon the quantities being treated and the equipment used. In general, the higher the temperatures and the lower the pressures employed, the fewer the number of repeated cycles required. At least two cycles are required and about five cycles will ordinarily be sufficient. The last cycle step is required to be the vacuum step; otherwise VN will be formed rather than $V_2N$.

The following example will further illustrate the present invention.

EXAMPLE

A mixture was prepared by blending $V_2O_3$ sized 325 mesh and finer, and carbon in the form of carbon black (5 microns Fischer Sub-Sieve) in proportions of three moles of carbon per mole of $V_2O_3$. The weight ratio in the mixture was 100 lbs. of $V_2O_3$ to 24 lbs. of carbon. The mixture was briquetted into shapes 1¾ inches × 1¼ inches × 1 inch.

100 lbs of the briquetts were placed in a refractory lined, graphite resistance heated vacuum furnace on a hearth with a total section about 9 feet × 5.5 feet to cover about 1/6 of the total hearth area. The furnace and charge were heated to 1000° C while the pressure in the furnace was reduced to the range of 4600 microns to 1500 microns by continuously applying a vacuum by means of Kinney mechanical pumps. These conditions were maintained for four hours. The temperature was subsequently raised to 1400° C and held for seven hours while the presure in the furnace was maintained in the range of 5000 microns to 250 microns. At the end of seven hours evolution of CO essentially ceased as determined by the observation that the furnace pressure stabilized, i.e. remained substantially constant in the range of 100 to 300 microns. Nitrogen was then introduced into the furnace and maintained at a pressure of 4 inches $H_2O$ for one hour at 1400° C. The above procedure was repeated in accordance with the following schedule:

| Temperature | Time | Pressure |
|---|---|---|
| 1400° C | 6 hours | 1500 microns to 225 microns |
| 1400° C | 1 hour | 4 inches H$_2$O, nitrogen |
| 1400° C | 6 hours | 1700 microns to 225 microns |
| 1400° C | 1 hour | 4 inches H$_2$O, nitrogen |
| 1400° C | 6 hours | 1500 microns to 225 microns |
| 1400° C | 1 hour | 4 inches H$_2$O, nitrogen |
| 1400° C | 9 hours | 1450 microns to 125 microns |
| Cool to ambient | | argon, atmospheric pressure |

The resulting furnaced material had the following average analysis

| | |
|---|---|
| N | 10.9% by weight |
| C | 0.95% by weight |
| O | 0.64% by weight |
| V | Balance |

What is claimed is:

1. A method for making a material containing vanadium and nitrogen substantially in the form of V$_2$N and containing less than about 2% by weight in the aggregate of carbon and oxygen said method comprising i. providing a mixture of V$_2$O$_3$ and carbon in substantially stoichiometric proportions in accordance with the following formula:

$$V_2O_3 + 3 C \rightarrow 2 V + 3 CO$$

ii. subjecting the mixture in a furnace to a temperature in the range of from about 1100° C to 1500° C under a reduced pressure in the range of from about 5mm to 100 microns to cause reaction between mixture constituents and the evolution of CO and maintaining the temperature and pressure in said ranges until CO is substantially no longer evolved from the mixture iii. maintaining the temperature in the furnace in the range of about 1100° C to 1500° C and introducing nitrogen gas into the furnace to provide a nitrogen atmosphere in the furnace at a pressure of at least about 0.25 atmosphere iv. thereafter repeating, in sequence, step (ii), step (iii) and step (ii) until the nitrogen content of the mixture is in the range of about 10 to 12 by weight v. subsequently cooling the mixture in a nonoxidizing environment.

2. A method in accordance with claim 1 wherein step (iv) is repeated up to five times.

* * * * *